INVENTOR
DONALD L. SMEAL

BY Cushman, Darby & Cushman
ATTORNEYS

INVENTOR
DONALD L. SMEAL
BY Cushman, Darby & Cushman
ATTORNEYS

INVENTOR
DONALD L. SMEAL

BY Cushman, Darby & Cushman
ATTORNEYS

Aug. 28, 1962 D. L. SMEAL 3,051,095
IRRIGATION PIPE MOVING APPARATUS
Filed Oct. 9, 1961 7 Sheets-Sheet 5

INVENTOR
DONALD L. SMEAL

BY Cushman, Darby & Cushman
ATTORNEYS

Aug. 28, 1962   D. L. SMEAL   3,051,095
IRRIGATION PIPE MOVING APPARATUS
Filed Oct. 9, 1961   7 Sheets-Sheet 6
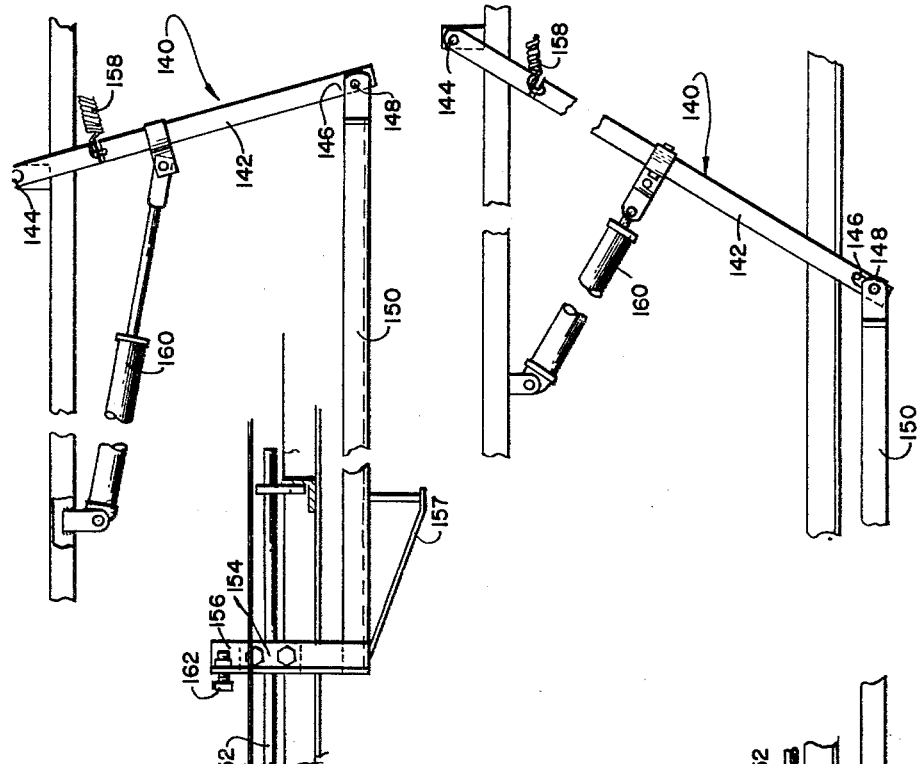
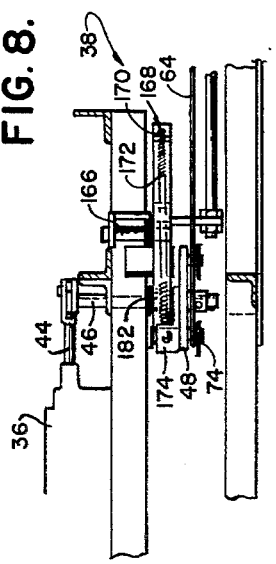
FIG. 8.
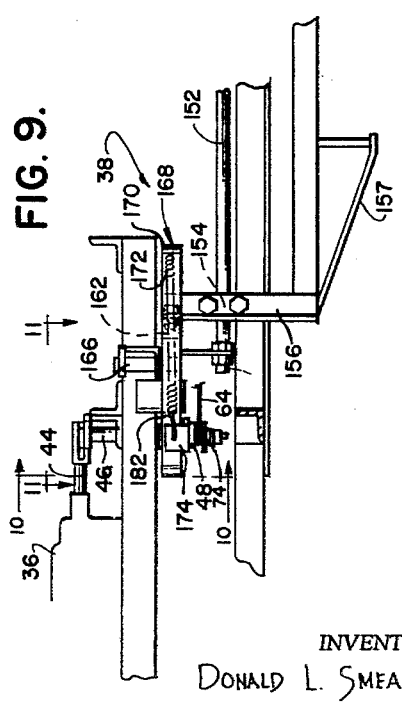
FIG. 9.
INVENTOR
DONALD L. SMEAL
BY Cushman, Darby & Cushman
ATTORNEYS Aug. 28, 1962 D. L. SMEAL 3,051,095
IRRIGATION PIPE MOVING APPARATUS
Filed Oct. 9, 1961 7 Sheets-Sheet 7

INVENTOR
DONALD L. SMEAL

BY Cushman, Darby & Cushman
ATTORNEYS

United States Patent Office 3,051,095
Patented Aug. 28, 1962

3,051,095
IRRIGATION PIPE MOVING APPARATUS
Donald L. Smeal, Snyder, Nebr., assignor to L. R. Nelson Mfg. Co., Peoria, Ill., a corporation of Illinois
Filed Oct. 9, 1961, Ser. No. 143,719
17 Claims. (Cl. 104—162)

This invention relates to article handling and more particularly to improvements in apparatus for moving irrigation pipe or the like in a field from one position to a second position laterally remote therefrom of the type disclosed in my co-pending application Serial No. 783,299, filed December 29, 1958. This application constitutes a continuation-in-part of my above-mentioned application and the latter is hereby incorporated by reference in this application.

The above-mentioned co-pending application discloses an apparatus for substantially automatically effecting movement of irrigation pipe sections from one position in a field to a second position laterally remote therefrom and comprises a self-propelled vehicle provided with means for automatically steering the same down a furrow in a field. The vehicle has an elongated boom mounted thereon intermediate its ends for tilting movement about a longitudinal horizontal axis and for swinging movement about a vertical axis. The longer portion of the boom which extends laterally outwardly from the vehicle in operation, has mounted thereon for movement therealong a pipe handling carriage, the carriage including a pipe gripping assembly mounted for vertical movement with respect to the carriage frame by suitable linkage mechanism.

In the normal sequence of operation of the above-mentioned apparatus, the vehicle is set to run on dry land at a position adjacent the position where the pipe sections are to be moved, and the operator controls the apparatus from a position adjacent the end of the boom where the sections to be moved are located. The operator first presses a control button positioned on the outer end of the boom which actuates a power operated mechanism to effect movement of the pipe handling carriage toward the outer end of the boom. During this movement, the weight of the carrier effects a downward pivotal movement of the outer end of the boom until the latter is disposed in supporting relation to an end stand assembly mounted on the outer end of the boom. When the carrier reaches the outer end of the boom, the moving means is automatically shut off and the operator then effects a manual movement of the pipe gripping assembly downwardly into engagement with the pipe section to be moved. With the pipe gripping assembly in engagement with the pipe, the latter is moved into raised position on the carriage frame. Next, the operator actuates the carriage moving means to effect movement of the carriage with the pipe supported thereon toward the vehicle. When the carriage reaches the proper discharge position adjacent the vehicle, the linkage mechanism is automatically released to controllably lower the pipe section to the ground and the pipe gripping assembly is automatically released when it reaches a predetermined position with respect to the ground. Upon release of the pipe section, the pipe gripping assembly is biased back into its raised position with respect to the carriage, and this movement automatically effects a forward operation of the vehicle which continues until the operator manually stops the same.

The present invention relates to various improvements in the mechanism for effecting movement of the pipe handling carriage or carriage assembly along the boom in both directions. In its broadest aspects, the present invention contemplates the provision of improved control assembly means carried by the boom adjacent the outer end thereof and adjacent the vehicle for controlling the operation of the carriage moving mechanism and for permitting uncontrolled manual movement thereof. The present invention also contemplates improved means for bringing the moving carriage assembly to a complete stop when a pipe section is supported thereby so as to reduce the inertia forces acting on the pipe section.

Accordingly, it is an object of the present invention to provide an improved carriage moving mechanism in an apparatus of the type described which is effective to move the carriage assembly through its cycle of operation with optimum speed and optimum safety.

Another object of the present invention is the provision of a carriage moving mechanism of the type described having improved means for safely decelerating the carriage assembly to a complete stop when the latter is supporting a pipe section.

Another object of the present invention is the provision of improved means for controlling the operation of the power operated carriage moving mechanism whereby the carriage assembly can be selectively power operated through its normal cycle or manually moved.

Still another object of the present invention is the provision of a carriage moving mechanism of the type described embodying inner an outer control assemblies, one of the control assemblies being mounted for movement into a plurality of adjusted positions along the boom for the purpose of determining the extent of travel of the carriage along the boom.

Still another object of the present invention is the provision of a carriage moving mechanism of the type described which is simple in construction, efficient in operation, and economical to manufacture and maintain.

These and other objects of the present invention will become more apparent during the course of the following detailed description and appended claims.

The invention can best be understood with reference to the accompanying drawings wherein an illustrative embodiment is shown.

In the drawings:

FIGURE 8 is a fragmentary, sectional view of the decelerating unit and inner control assembly showing the parts in a position corresponding with the position shown in FIGURE 4;

FIGURE 9 is a view similar to FIGURE 8 showing the parts in a position corresponding with the position shown in FIGURE 1;

Figure 1:
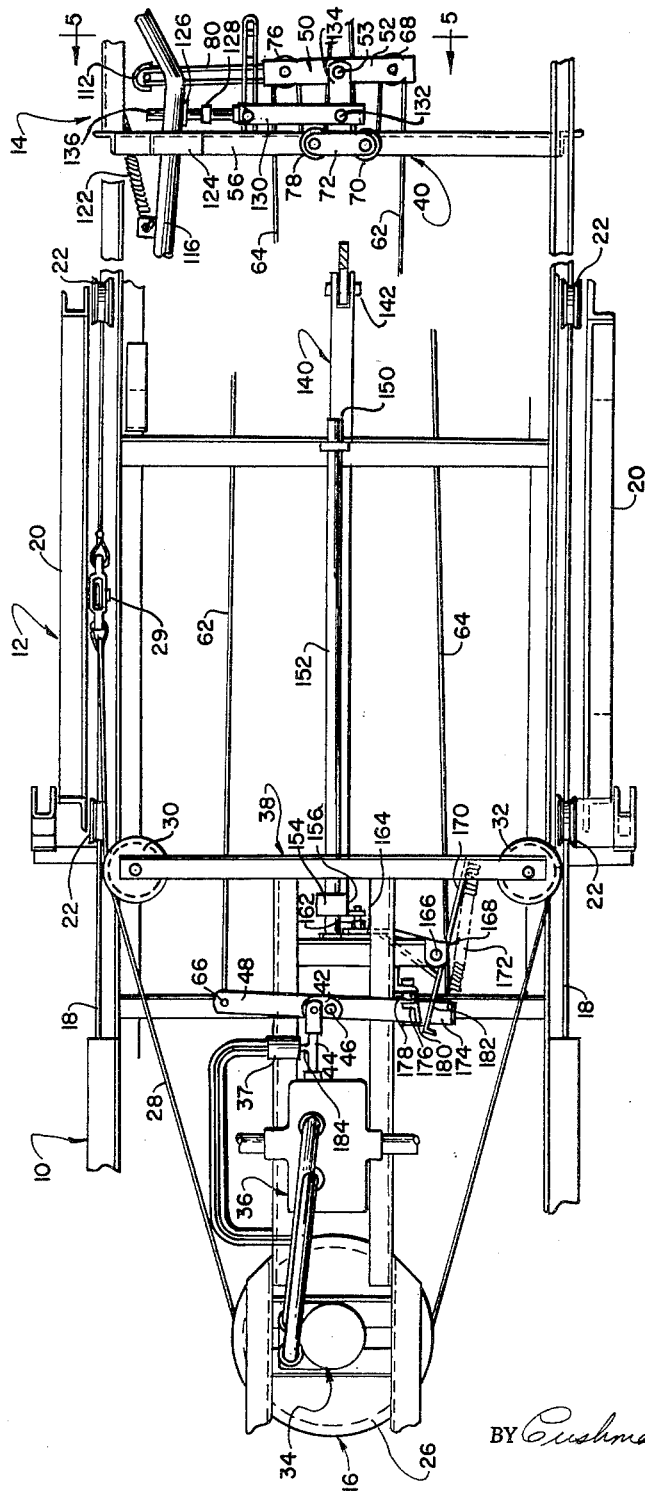
FIGURE 1 is a fragmentary top plan view of an apparatus embodying the principles of the present invention, the parts being shown in the pipe discharge position just prior to the movement of the carriage assembly outwardly toward the outer end of the boom.

Referring now more particularly to the drawings, there is shown in FIGURES 1–4 a portion of the pipe moving apparatus such as disclosed in the above-mentioned co-pending application. Insofar as the details of the construction of the apparatus are concerned, reference may be had to the co-pending application. For present purposes, only that part of the apparatus which relates to the present invention has been illustrated in the drawings. In brief, these parts include an elongated boom, generally indicated at 10, a pipe handling carriage assembly, generally indicated at 12, which is mounted on the boom for movement therealong between a position adjacent the boom carrying vehicle (not shown) and a position adjacent the outer end of the boom, an endstand assembly generally indicated at 14, mounted on the outer end of the boom for movement into different fixed positions of adjustment therealong, and a power-driven cable assembly, generally indicated at 16, for effecting movement of the carriage assembly between the operative positions thereof.

As best shown in FIGURES 1–4, the boom 10 includes a pair of lower horizontally spaced parallel tracks 18 and the carriage assembly 12 includes a frame 20 having rollers 22 mounted thereon which engage the tracks 18 to support the carriage frame 20 on the boom for rolling movement therealong. The cable assembly 16 includes a main drive pulley 26 around which is trained a cable 28. One end of the cable is connected with the carriage frame through a latch arm 29 similar to that described in detail in the co-pending application. From this connection, the cable is trained about an idler pulley 30 mounted on the boom adjacent the supporting vehicle therefor, then extends around the main drive pulley 26 and from there around an idler pulley 32 mounted on the boom in laterally spaced relation to the idler pulley 30. The cable 28 then extends around a pair of idler pulleys 33 (see FIGURE 2) which are fixedly mounted on the outer end of the boom. The opposite end of the cable is then secured to the latch arm 29 in a manner similar to that disclosed in the above-mentioned co-pending application.

In general, the cable assembly 16 is similar in construction and operation to the cable assembly disclosed in the co-pending application. Thus, as disclosed therein, the latch arm 29 is effective to lock the carriage assembly in its discharge position adjacent the inner end of the boom and rotation of the driving pulley in a clockwise direction, as viewed in FIGURE 1, will first move the arm 29 to unlock the carriage assembly and then the cable will effect movement of the carriage assembly in a direction toward the outer end thereof. Conversely, rotational movement of the driving pulley 26 in a counter-clockwise direction, as viewed in FIGURE 1, will effect movement of the carriage assembly in a direction from the outer end of the boom toward the inner end thereof.

In accordance with the principles of the present invention, the driving pulley 26 is preferably driven by a hydraulic motor, generally indicated at 34, having its output shaft fixedly connected with the driving pulley 26. The hydraulic motor may be of any conventional construction of the type which is capable of reverse operation, for example, one embodiment is the Char-Lynn hydraulic orbit motor series MFB–14 produced by Char-Lynn Company of Minneapolis, Minn. It will be understood that the hydraulic motor 34 is connected in a hydraulic circuit including a source of high pressure fluid, such as a pump or the like (not shown), and a source of low pressure fluid, such as a sump or the like (not shown). Communication of these fluid sources with the hydraulic motor 34 is controlled through a valve mechanism, generally indicated at 36. The valve mechanism may also be of conventional construction and preferably constitutes a four-way valve having the usual neutral or null position wherein movement of fluid to and from the hydraulic motor is positively prevented so as to lock the hydraulic motor against movement, and two opposed motor driving positions wherein the hydraulic motor is driven in opposite directions respectively. An example of a valve mechanism that can be utilized is the one spool model SP control valve manufactured by Gresen Mfg. Co. of Minneapolis, Minn. Preferably the lines between the valve mechanism 36 and the hydraulic motor 34 have a by-pass valve 37 connected therebetween which is normally spring pressed closed but is openable during the initial portion of the movement of the valve mechanism 36 from its null position to provide the latter with a fourth position constituting a float position wherein the hydraulic motor 34 is not driven but is free to rotate in response to the manual movement of the carriage frame along the boom. Alternatively, a four-way valve having a built-in float position may be utilized.

The valve mechanism 36 is moved into the above-mentioned four operable positions by inner and outer control assemblies 38 and 40 carried by the boom at positions adjacent the supporting vehicle therefor and the outer end thereof respectively. As best shown in FIGURES 1–4, 10 and 11, the inner control assembly 38 includes an arm 42 having one end thereof pivotally connected with a valve stem 44 of the valve mechanism 36 and the opposite end thereof fixed to the upper end of a vertical shaft 46, the central portion of which is suitably journalled on the boom. Fixed to the lower end of the shaft 46 is the central portion of an elongated actuated lever 48, which is adapted to be pivoted in response to the pivotal movement of a corresponding actuating lever 50 forming a part of the outer control assembly 40.

As best shown in FIGURES 1–7, the actuating lever 50 comprises a pair of spaced horizontally extending elongated parallel bars 52 pivotally mounted intermediate their ends, as by a vertical shaft 53, on mounting plate 54, the outer end of which extends between the bars 52. The inner end of the plate 54 is rigidly secured, as by welding or the like, to a transverse member 56 forming a part of a frame, generally indicated at 58, of the endstand assembly 14.

Figures 5, 6, 7:
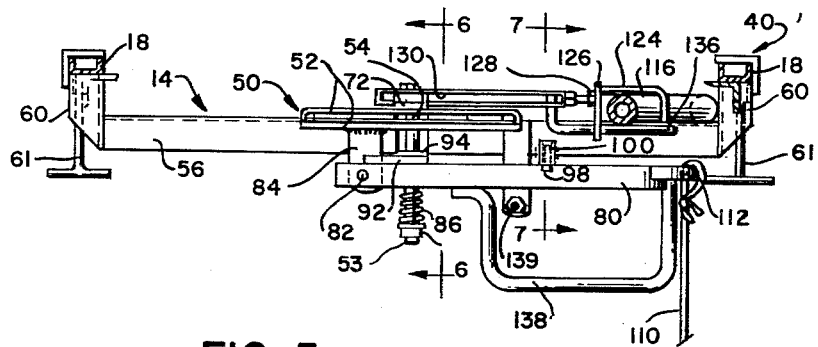
FIGURE 5 is an enlarged, fragmentary sectional view taken along the line 5—5 of FIGURE 1.
FIGURE 6 is an enlarged fragmentary sectional view taken along the line 6—6 of FIGURE 5.
FIGURE 7 is an enlarged fragmentary sectional view taken along the line 7—7 of FIGURE 5.
Figure 10:
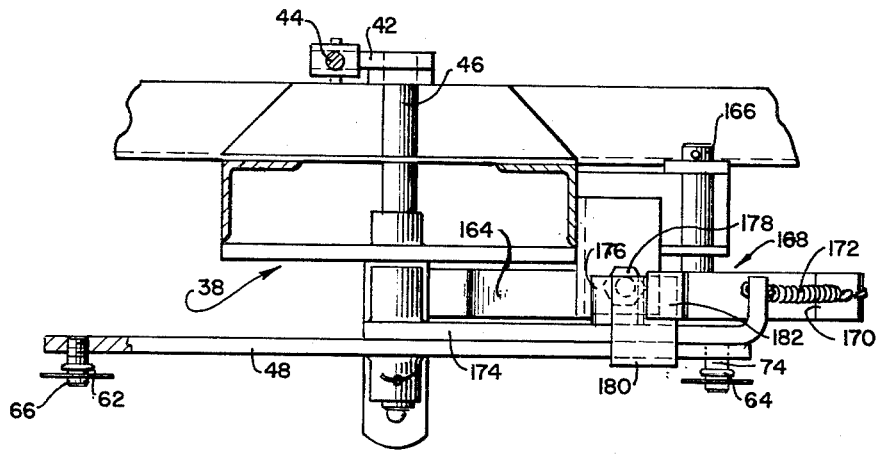
FIGURE 10 is an enlarged, fragmentary sectional view taken along the line 10—10 of FIGURE 9.

As best shown in FIGURE 5, the endstand assembly frame 58 is mounted on the boom tracks in longitudinally sliding relation with respect thereto, as by U-shaped brackets 60 which are fixedly secured to the tracks in any desired position of longitudinal adjustment therealong as by turn bolts 61.

In order to accommodate this longitudinal adjustment of the end stand assembly frame 58 and at the same time maintain a responsive movement between the inner and outer actuating levers 48 and 50, the levers are interconnected by means of a pair of elongated cables 62 and 64. One end of the cable 62 is secured, as indicated at 66, to one end of the actuating lever 48 and extends around a pulley 68 mounted between the outer actuating lever bars 52 adjacent the end thereof opposite from the end 66 of the lever 48. From the pulley 68 the cable 62 extends around a fixed idler pulley 70 mounted in fixed position above the frame member 56, as by a plate 72 fixed to the mounting plate 54. From the idler pulley 70, the actuating cable 62 extends to the outer end of the boom where it is anchored by an adjustable eye bolt 79 or the like (see FIGURE 2).

In a similar manner, the cable 64 has one end anchored to the opposite end of the lever 48, as indicated at 74, and extends therefrom around a pulley 76 mounted between the outer actuating lever bars 52 adjacent the opposite ends thereof. As before, the cable 64 then extends around an idler pulley 78 journalled in a fixed position between the frame member 56 and the mounted plate 72 and is then anchored to the adjustable eye bolt 79 in the manner previously indicated.

From the above it can be seen that pivotal movement of either of the actuating levers 48 or 50 will effect an opposite corresponding pivotal movement of the other actuating lever through the operation of the actuating cables 62 and 64. Moreover, this action will take place regardless of the fixed position of adjustment of the endstand frame with respect to the boom. Furthermore, it will be noted that pivotal movement of either of the actuating levers will effect a corresponding movement of the valve stem 44. In the position of the levers and the valve stem illustrated in FIGURE 1, the valve mechanism is disposed in its float position wherein the hydraulic fluid to the motor 34 is bypassed through the valve 37 so as to have free rotational movement in either direction. The valve mechanism 36 is such that a full inward movement of the valve stem 44 with respect to the valve mechanism housing will produce a clockwise rotational movement of the hydraulic motor which in turn, through the cable assembly 16, will effect an unlocking movement of the latch arm 29 and a movement of the carriage assembly 12 outwardly toward the outer end of the boom.

In order to effect this movement of the valve mechanism, the outer control assembly 40 includes a starting lever 80 which is preferably made up of a pair of spaced elongated bars. One end of the lever 80 is pivoted, as indicated at 82, to the lower end of a lug 84, the upper end of which is fixedly secured, as by welding or the like, to the lower bar 52 of the actuating lever 50 at a position spaced from the shaft 53. The shaft 53 extends between the bars of the lever 80 and has a coil spring 86 mounted in surrounding relation to the lower end thereof, the upper end of which engages the lever 80 and the lower end of which engages a nut 90 threaded on the lower extremity of the shaft. The spring 86 thus serves to resiliently urge the lever 80 into an upper limiting position wherein the upper surface of the lever engages a stop plate 92 fixedly secured, as by welding or the like, to the lug 84 and extending horizontally therefrom in a position to receive the shaft 53 therethrough. A brace plate 94 is rigidly secured at one end to the frame member 56 and extends outwardly therefrom in vertically spaced relation below the mounting plate 54 in a position to receive the shaft 53.

Figure 3:
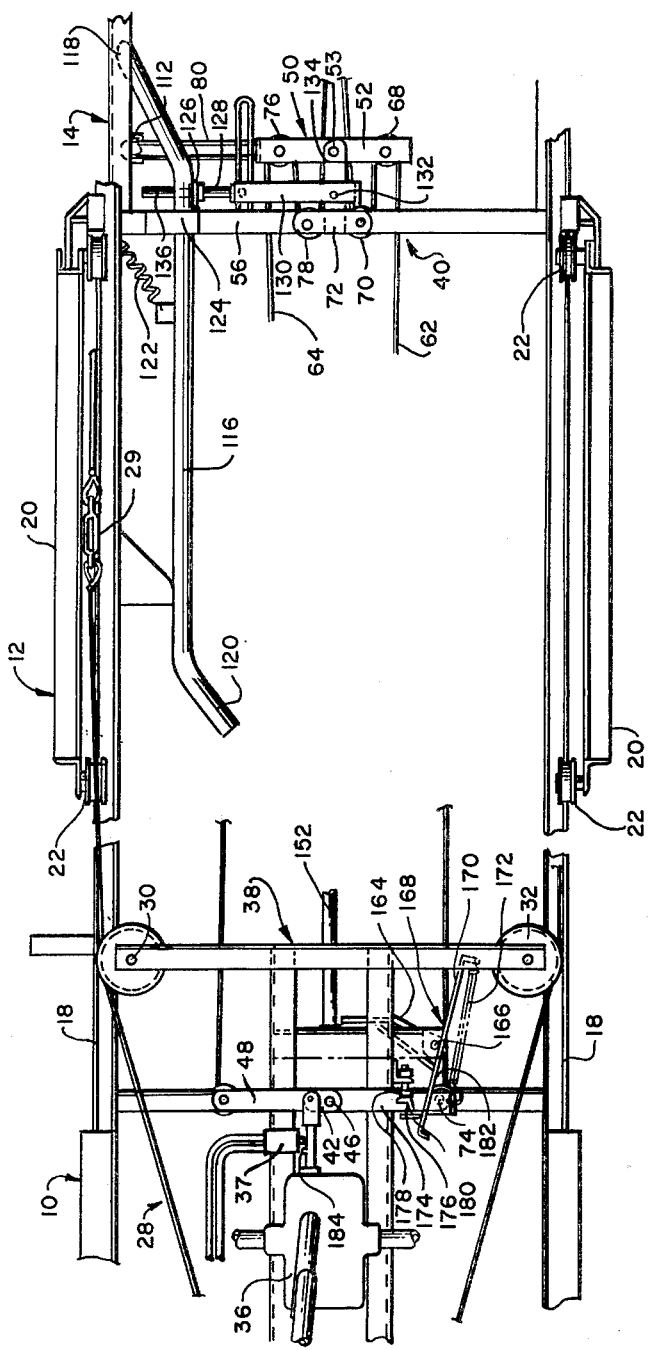
FIGURE 3 is a view similar to FIGURE 1 showing the position of the parts when the carriage assembly is disposed in its pipe pick-up position.

The starting lever 80 in its upper limiting position is restrained against pivotal movement about the shaft 53 from the neutral position shown in FIGURE 3 by means of a pair of opposed locking elements 96 and 98. As best shown in FIGURE 7, the locking elements are mounted between the legs of a U-shaped bracket 100 fixed to the frame member 56. The bracket 100 extends over the starting lever 80 so that the upper surface of the latter will engage the lower surface of the bracket when the starting lever is in its upper limiting position. Each of the locking elements is pivoted, as by a pivot pin 102, adjacent one end thereof so that the opposite end, which includes a vertical abutment surface 106, will extend below the lower surface of the bracket in a position to engage the starting lever. Each locking element has a stop pin 104 associated therewith which serves to limit the forward movement of the associated abutment surface 106 thereof. Each locking element is biased by its own weight into such limiting position and is freely movable upwardly from such position by engagement of the starting lever 80 with a lower cam surface 108 formed on each of the locking elements.

From the above it can be seen that in order for the starting lever 80 to be pivoted about the axis of the shaft 53 it must first be pivoted downwardly about the axis of pivot pin 82 in order to free the same from its position between the locking elements 96 and 98. To accomplish this movement, there is provided a rope or cable 110 which has one end thereof secured to the endstand frame 58 at a position spaced outwardly from the end of the starting lever when the latter is disposed in its upper limiting position, the cable being looped downwardly and then extending through an eye 112 fixed to the outer end of the starting lever and having its opposite end secured to the endstand frame adjacent the other end thereof. Mounted on the looped portion of the cable 110 is a ring 114. It can be seen that by pulling the ring downwardly, the cable 110 will first effect a downward pivotal movement of the starting lever 80 about the pivot pin 82 against the action of the spring 86 and then a pivotal movement of the starting lever 80 in a clockwise direction as viewed in FIGURES 1 and 2 about the shaft 53.

As indicated above, the above-mentioned movement of the starting lever 80 as a result of the downward pull on the ring 114 is operable to effect an outward movement of the carriage assembly toward the outer end of the boom. In order to halt the outward movement of the carriage assembly there is included in the outer control assembly 40 an elongated carriage engaging arm 116 having one end thereof pivoted, as at 118, to one side of the endstand frame 56 and having its opposite end extending toward the vehicle supported end of the boom and turned inwardly, as indicated at 120. Preferably, the arm 116 is biased into an inoperative position, as by a coil spring 122, extending between the endstand frame 56 and a suitable lug mounted on the arm intermediate the ends thereof. In addition, the arm is guided for pivotal movement in a horizontal plane by engagement with the upper surface of the frame member 56 and below an inverted U-shaped bracket 124 fixedly secured to the upper surface of the frame member.

As best shown in FIGURE 5, mounted on the arm 116 in a position outwardly of the U-shaped bracket is a vertical abutment plate 126 which is arranged to engage the end of a bolt 128 adjustably mounted on the outer end of a link 130. The inner end of the link 130 is pivotally connected, at 132, to one end of an arm 134, the opposite end of which is fixedly secured to the upper bar 52 of the lever 50 and receives the shaft 53. The outer end of the link 130 is guidingly supported with respect to the carriage engaging arm 116 by an L-shaped rod 136, the horizontal leg of which extends through an enlarged opening in the abutment plate 126 and the vertical leg of which is secured to the outer end of the connecting link.

In order to effect pivotal movement of the starting lever 80 in a counterclockwise direction, as viewed in FIGURE 3, a U-shaped hand rod 138 is rigidly secured to the lower surface of the starting lever adjacent its outer end. This opposite pivotal movement of the starting lever, which is limited by an adjustable stop bolt 139 mounted on the frame member 56 in a position to engage the starting lever, has the effect of reversing the movement of the hydraulic motor so as to effect movement of the carriage assembly away from the outer end of the boom and toward the vehicle supported end thereof. This movement of the carriage assembly is decelerated by a decelerating unit, generally indicated at 140, forming a part of the control assembly 38.

As best shown in FIGURES 8 and 9, the decelerating unit 140 includes a vertically extending arm 142 pivoted at its upper end to the upper portion of the boom, as indicated at 144. The lower end of the arm 142 is provided with an elongated slot 146 having a pin 148 extending therethrough which is pivotally connected with one end of a longitudinally extending carriage engaging member 150. The opposite end of the member 150 is slidably supported on a longitudinally extending rod 152, as by a bearing block 154 carried by an upwardly extending extension 156 fixed to the adjacent end of the member 150. Fixed to the lower portion of the opposite end of the member 150 is a depending bracket 157 adapted to be engaged by the carriage frame.

The arm 142 and carriage engaging member 150 are biased into an outward limiting position by any suitable means, such as a coil spring 158 suitably connected between the arm and the boom. Movement of the arm 142 in the opposite direction against the action of the spring 158 is controlled by a conventional piston and cylindrical type shock absorber 160 which serves to absorb the impact energy transmitted to the arm 142 through the carriage and engaging member 150 where the latter is engaged by the carriage assembly.

Figure 11:
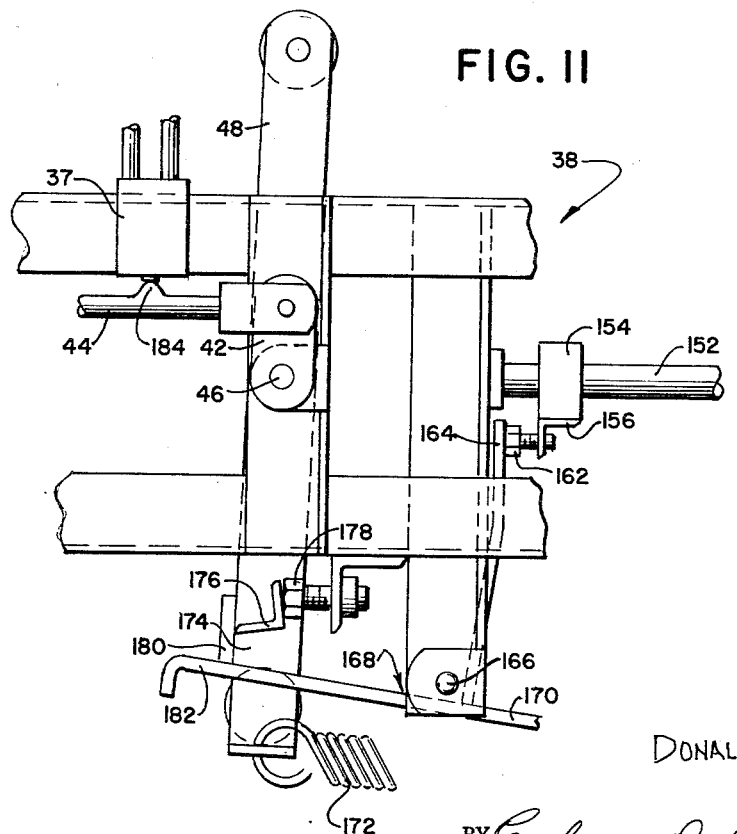
FIGURE 11 is an enlarged, fragmentary plan view taken along the line 11—11 of FIGURE 9.

Mounted on the upper end of the extension 156 is an adjustable abutment bolt 162 which is arranged to engage the outer end of an arm 164 mounted for pivotal movement about a vertical shaft 166 suitably journaled on the boom. The arm 164 forms a part of a bell crank lever, generally indicated at 168, which also includes an arm 170 extending toward the outer end of the boom and provided with a bent outer end for receiving one end of a coil spring 172. The opposite end of the spring 172 is connected to the upturned outer end of a latch member 174 having its opposite end pivotally mounted on the shaft 46 for pivotal movement thereabout independent of the pivotal movement of the associated actuated lever 48. Fixedly secured to the latch member, as by welding or the like, is an angular lug 176 which includes a transversely extending abutment surface positioned to engage the head of an adjustable stop bolt 178 mounted on the boom frame. As can be seen in FIGURE 11, the spring 172 thus serves to bias the latch member 174 into a position of engagement with the stop bolt 178.

The latch member 174 also includes a vertically extending transverse latch plate 180 extending outwardly from the lug 176 and downwardly with respect to the latching member 174. The latch plate 180 and angular lug 176 form angularly related surfaces which are arranged to receive the outer bent end of an arm 182 forming a part of the bell crank lever 168.

When the latch member 174 is disposed in its limiting position in engagement with the stop bolt 178 and the actuating lever 48 is disposed in alignment therewith, as shown in FIGURES 1 and 11, the by-pass valve 37 is disposed in its open position by means of a cam surface 184 formed on the valve stem arranged to engage the plunger of the by-pass valve 37. It will be understood that the by-pass valve 37 may be of any suitable construction and preferably is simply a one-way valve of the type adapted to be spring pressed into a closed position and moved into an open position by inward movement of the plunger.

*Operation*

It will be understood that the present structure forms only a part of the entire sequence of operation of the apparatus as disclosed in the co-pending application. Insofar as the present application is concerned, the cycle of operation involves the movement of the carriage assembly without a pipe supported thereby from a position adjacent the boom supporting vehicle to a position adjacent the outer end of the boom. With the carriage disposed at the outer end of the boom, a pipe section is then engaged into supporting relation therewith and a return movement of the carriage toward the vehicle is effected.

In addition to performing the above movements of the carriage, two important features are provided by the present invention. The first, the control assemblies are such that they permit adjustment of the endstand assembly on the outer end of the boom to accommodate the particular row spacing encountered without the necessity of making correcting adjustments to the control assemblies. This is accomplished through the action of the actuating cables 62 and 64 and the pulleys 68, 70, 76 and 78 which will accommodate such movement and at the same time effect corresponding movement of the actuating member 48 in response to pivotal movement of the actuating member 50 at the outer end of the boom.

Second, it will be noted that when the carriage assembly is moving inwardly toward the vehicle, considerable weight is added to the carriage by the pipe section carried thereby. Thus, this added weight provides the entire carriage assembly with considerable momentum once it is set into motion and damage to the pipe section, as well as the apparatus, may occur if this moving mass is brought to a stop too suddenly. The deceleration unit 140 of the present invention serves to retard this movement of the carriage assembly in a controlled manner so that there are no great shock forces transmitted to the pipe section.

Insofar as the operation of the present invention is concerned in relation to the above-mentioned cycle of operation, FIGURE 1 illustrates the position of the parts at a point which may be conveniently chosen as the beginning of the cycle, namely, when the empty carriage is disposed adjacent the vehicle end of the boom ready to be moved outwardly to the end of the boom to pick up the next pipe section.

It will be noted that the valve mechanism 36 is disposed in its neutral position thus preventing power actuation of the hydraulic motor. Moreover, by-pass valve 37 is open by engagement of the cam surface 184 with the plunger thereof as best shown in FIGURE 11. The carriage assembly is retained in the position shown in FIGURE 1 through latch arm 29 as is fully disclosed in the co-pending application. When it is desired to commence the movement of the carriage assembly to the outer end of the boom, the operator simply pulls on the ring 114 which has the effect of first pivoting the starting lever 80 downwardly about the pivot pin 82 against the action of spring 86 to move the starting lever from between the locking elements 96 and 98. Continued downward movement of the ring 114 serves to effect a swinging movement of the starting lever in a direction toward the outer end of the boom about the shaft 53. Due to the connection of the starting lever with the actuating lever 50 through leg 84, the actuating lever 50 will likewise be pivoted in a clockwise direction as viewed in FIGURE 1 and this movement will, in turn, through the operation of the actuating cables 62 and 64, effect a counter-clockwise movement of the actuating lever 48 as viewed in FIGURE 1. This movement of the actuating member 48 from the position shown in FIGURE 1 to the position shown in FIGURE 2, will effect an inward movement of the valve stem 44 through the operation of shaft 46 and arm 42 to effect a movement of the valve mechanism 36 into an open position causing clockwise rotation of the hydraulic motor as viewed in FIGURE 2. Thus, the latch arm 29 is first released and then movement of the carriage assembly toward the outer end of the boom is commenced.

It will be noted that when the operator releases the ring 114, the spring 86 will effect movement of the starting lever 80 back into its upper limiting position, disposed on the opposite side of the locking element 98 as shown in dotted lines in FIGURE 7. The above-mentioned parts are biased and frictionally interrelated so that they will remain in the position shown in FIGURE 2 until positively moved therefrom so that the outward movement of the carriage assembly will continue without the necessity of constant manual actuating by the operator.

Figure 2:
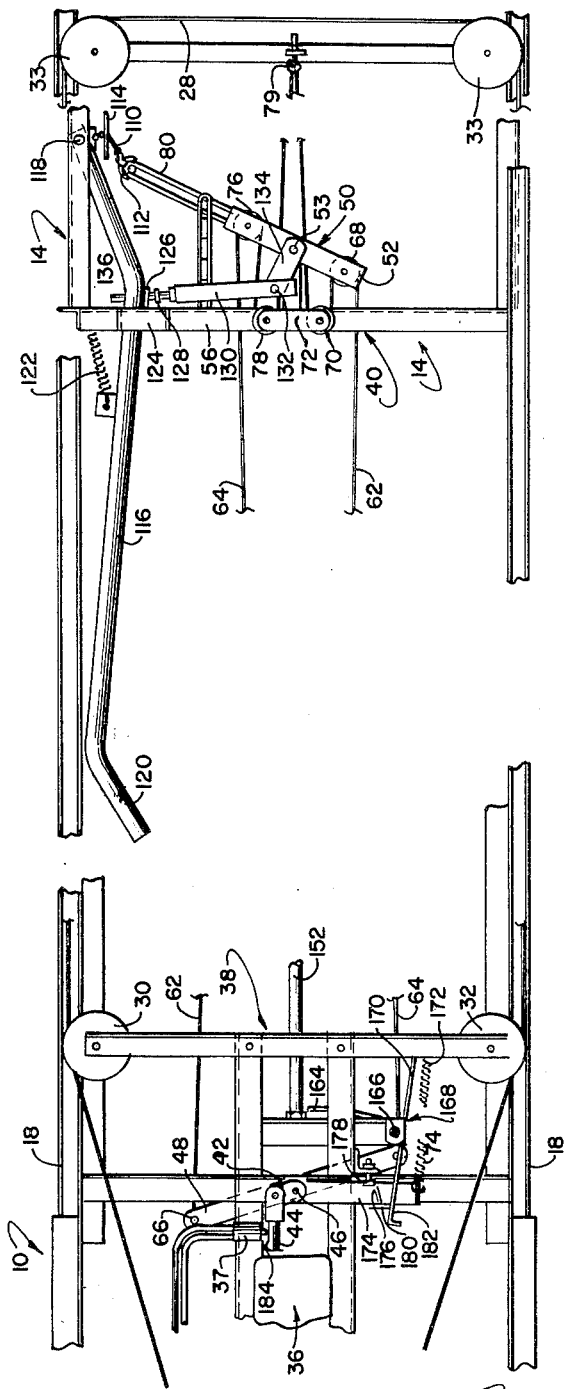
FIGURE 2 is a view similar to FIGURE 1 showing the position of the parts during the movement of the carriage assembly outwardly toward the outer end of the boom.

When the carriage nears the outer end of the boom, the outer end 120 of the arm 116 will be engaged by a portion of the carriage frame. As shown in FIGURE 2, the movement of the starting lever 80 into the position shown therein, will effect a corresponding movement of the connecting link 130 through the arm 134 so as to dispose the bolt 128 in substantial engagement with the abutment plate 126 on the arm 116. Thus, when the arm 116 is pivoted against the action of the spring 122 by engagement of the carriage therewith, this pivotal movement of the arm will cause the abutment plate 126 to engage the bolt 128 and effect movement of the connecting link 130 therewith to thus pivot the actuating lever 50 into its neutral position as shown in FIGURE 3, through the action of the arm 134.

In this regard, it will be noted that the starting lever 80 will move from the dotted line position shown in FIGURE 7 to the solid line position shown therein during which the locking element 98 will be pivoted upwardly through the engagement of the cam surface 108 thereby. Moreover, the abutment surface 106 of locking element 96 serves to limit the extent of the pivotal movement of both the starting lever and the actuating lever. In addition, the movement of the actuating lever 50 from the position shown in FIGURE 2 to the position shown in FIGURE 3 will effect a corresponding movement of the actuating lever 48 which, in turn, will effect movement of the valve stem 44 into its neutral position wherein the hydraulic motor is locked against rotation. Normally there will be a certain amount of leakage tolerance in the hydraulic motor which will provide some shock absorption to the instantaneous halting of the movement of the carriage assembly.

Should it become necessary to effect slight movements of the carriage assembly with respect to the outer end of the boom to align the pipe gripping assembly thereof with the pipe section to be moved, the operator can manually effect such movements by engaging the hand rod 138 and moving the starting lever about shaft 53 in a counter-clockwise direction as viewed in FIGURE 3, from the position shown in FIGURE 3 to the position shown in FIGURE 1. Such movement of the start lever 80 is effected by downward pivotal movement thereof about the pivot pin 82 and then a swinging movement in a counter-clockwise direction about the shaft 53 in a manner similar to that previously described connected with downward movement of the ring 114. Such manual movement is eliminated to the point of contact of the actuating lever 48 with the latch plate 180 of the latching member 174, as positioned against stop bolt 178 by spring 172. With the starting lever 80 in the position shown in FIGURE 1 the by-pass valve 37 will open permitting the hydraulic motor to be driven through manual movement of the carriage frame. After the carriage has been manually moved with the hydraulic system disposed in its float position, as indicated above, the starting lever is then moved back into the position shown in FIGURE 3, thus locking the carriage assembly against movement in either direction by hydraulically locking the hydraulic motor against movement. It will be understood that the leakage provided in the hydraulic motor to somewhat retard the instantaneous halting of the carriage assembly when it is moved into the position shown in FIGURE 3 is not sufficient to permit rotation of the hydraulic motor in response to manual movement of the carriage assembly. Such manual movement is accomplished only when the hydraulic system is in its float position.

When it is desired to effect movement of the carriage assembly inwardly from the outer end of the boom, the operator grasps the hand rod 138 and manually effects a downward pivotal movement thereof about the pivot pin 82 and then a swinging movement away from the outer end of the boom about the shaft 53 in a manner similar to that previously described connected with downward movement of the ring 114. Of course, this movement of the starting lever will effect a counter-clockwise pivotal movement of the actuating lever 50 into the position shown in FIGURE 4. Here again, this movement of the actuating lever 50 effects a clockwise pivotal movement of the actuating lever 48 as viewed in FIGURE 4 which, in turn, effects a movement of the valve stem 44 outwardly of the valve mechanism housing into its opposite driving position to thus commence the movement of the carriage mechanism.

Figure 4:
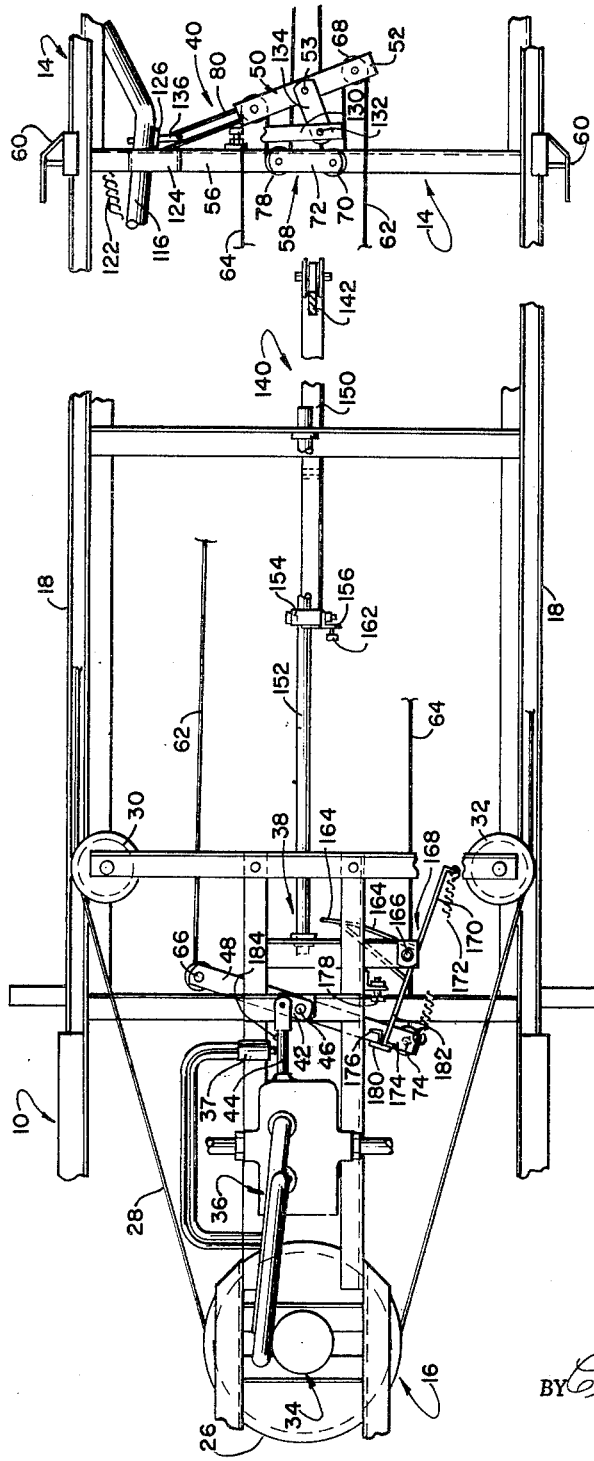
FIGURE 4 is a view similar to FIGURE 1 showing the position of the parts during the movement of the carriage assembly toward the inner end of the boom.

It will be noted that during the clockwise movement of the actuating lever 48, the latching member 174 will be pivoted in a clockwise direction therewith, as viewed in FIGURE 4, by virtue of the engagement of the actuating lever 48 with the latch plate 180. As the latch member 174 is moved, the latch plate 180 will move beyond the outer end of the bell crank lever arm 182 causing the bell crank lever 168 to pivot in a clockwise direction, as viewed in FIGURE 4, until the outer end of the arm 182 engages between the annular surface provided by the annular lug 176 and latch plate 180 through the operation of the coil spring 172. It will be noted that this movement of the bell crank lever 168 serves to move the outer end of the arm 164 into a position within the path of movement of the abutment bolt 162.

It can be seen that when the carriage assembly nears the inner end of the boom, the bracket 157 on the carriage engaging member 150 will be initially engaged by a portion of the carriage frame so that the member 150 will be moved in response to the further movement of the carriage assembly. This movement of the member 150 effects, in turn, a pivotal movement of the arm 142, which movement is resisted by the spring 158 and the shock absorber 160. Thus, in this way, the decelerator unit 140 serves to decelerate the movement of the carriage assembly by adding additional resistance to the rotational movement of the hydraulic motor. The decelerated unit 140 thus allows optimum carriage movement speeds which are in excess of those which could be utilized, if no controlled deceleration of the carriage were provided. With the present arrangement, there is a maximum operational speed maintained while at the same time, maximum safety against damage to the parts is also insured.

It will be noted that toward the end of the movement of the member 150 with the carriage assembly, the bolt 162 will engage the end of the arm 164 thus effecting a counter-clockwise pivotal movement of the bell crank lever 168, as viewed in FIGURE 4, to thereby disengage the bell crank lever arm 182 from the latch plate 180. This movement of the bell crank lever 168 will permit a counter-clockwise pivotal movement of the latching member 174 under the action of the spring 172 from the position shown in FIGURE 4 to the position shown in FIGURE 1. This movement of the latching member will likewise effect a movement of the actuating member 48 through the engagement of the latch plate 180 therewith until the angular lug 176 engages the stop bolt 178. In this way, the actuating lever 48 is moved back into the position shown in FIGURE 1 which, in turn, will effect the movement of the valve mechanism 36 into its neutral position and the by-pass valve back into its open position. There is sufficient momentum in the carriage assembly to move the same into its discharge position wherein it is locked by the latch arm 29.

It thus will be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirit and scope of the following claims.

I claim:

1. Apparatus of the type described comprising a boom, a carriage assembly mounted for movement along said boom between spaced limiting positions, power operated means for effecting movement of said carriage assembly between said positions in both directions, a control assembly carried by said boom adjacent each of said positions, one of said control assemblies including an actuating member movable between a plurality of control positions with respect to said power operated means including a first position wherein said power operated means is operable to prevent power operated movement of said carriage assembly, a second position wherein said power operated means is operable to effect movement of said carriage assembly in a direction toward one of said limiting positions, and a third position wherein said power operated means is operable to effect movement of said carriage assembly in a direction toward the other of said limiting positions, manually movable means carried by the other of said control assemblies and operatively connected with said actuating member for effecting movement of the latter from said first position to said second position and from said first position to said third position, means included in the control assembly adjacent said one limiting position operable in response to the movement of said carriage assembly into engagement therewith for effecting movement of said actuating member from said second position to said first position, and means included in the control assembly adjacent said other limiting position operable in response to the movement of said carriage assembly into engagement therewith for effecting movement of said actuating member from said third position to said first position.

2. Apparatus as defined in claim 1 wherein said other control assembly is carried by said boom for longitudinal movement therealong into any one of a plurality of different positions of adjustment, mechanical motion transmitting means connected with said actuating member and extending therefrom along said boom to said other control assembly, said manually movable means including a pivoted actuating lever connected with said motion transmitting means for continuous engagement therewith during the longitudinal movement of said other control assembly into said different positions of adjustment and for effecting movement of said actuating member in response to pivotal movement of said actuating lever in any position of adjustment of said other control assembly.

3. Apparatus as defined in claim 2 wherein said actuating member is mounted for pivotal movement and wherein said motion transmitting means comprises a pair of cables, each having one end connected with said actuating member and an opposite end anchored to said boom adjacent said other control assembly, each of said cables being trained intermediate the ends thereof about a pulley carried by said actuating lever and a fixed idler pulley mounted for longitudinal adjusting movement with said other control assembly.

4. Apparatus as defined in claim 1 including means operable in response to a portion of the movement of said actuating member in said first position for locking said power operated means to thereby prevent movement of said carriage assembly and means operable in response to another portion of the movement of said actuating member in said first position for unlocking said power operated means to thereby permit manual movement of said carriage assembly.

5. Apparatus as defined in claim 1 including carriage assembly engaging means mounted on said boom adjacent said one limiting position for movement in response to the movement of said carriage assembly toward and adjacent said one limiting position, and means for applying a yielding resistance to the movement of said carriage assembly engaging means to progressively retard the movement of said carriage assembly by said power operated means toward said one limiting position.

6. Apparatus of the type described comprising a boom, a carriage assembly mounted for movement along said boom between spaced limiting positions, power operated means for effecting movement of said carriage assembly between said positions in both directions, control means movable between a plurality of control positions with respect to said power operated means for controlling the latter including a first position wherein said power operated means is operable to prevent movement of said carriage assembly, a second position wherein said power operated means is operable to effect movement of said carriage assembly in a direction toward one of said limiting positions, a third position wherein said power operated means is operable to effect movement of said carriage assembly in a direction toward the other of said limiting positions, and a fourth position wherein said power operated means is operable to permit manual movement of said carriage assembly along said boom in either direction, and means for moving said control means into said four positions to thereby control the power operated movement of said carriage assembly between said limiting positions and permit selective manual movement of said carriage assembly.

7. Apparatus as defined in claim 6 wherein said means for moving said control means comprises a first actuating lever pivotally mounted intermediate its ends on said boom adjacent said other limiting position, a second actuating lever pivotally mounted intermediate its ends on said boom adjacent said one limiting position, and motion transmitting means operatively connecting said second lever for pivotal movement in response to the pivotal movement of said first lever.

8. Apparatus as defined in claim 7 wherein said means for moving said control means further includes a manually movable member connected with said first actuating lever for pivotal movement therewith.

9. Apparatus as defined in claim 8 wherein said means for moving said control means further includes means mounting said manually movable member for pivotal movement with respect to said first actuating lever between a first position wherein said first lever is pivoted in response to the manual movement of said manually movable member and a second position, means biasing said manually movable member into said second position, and means engageable with said manually movable member when the latter is disposed in said second position for limiting the movement of the latter and hence the movement of said first lever therewith.

10. Apparatus as defined in claim 7 wherein said means for moving said control means further includes an arm mounted on said boom adjacent said other limiting position for movement between first and second positions, means biasing said arm into said first position, said arm being engageable by a portion of said carriage assembly and movable from said first position to said second position in response to the movement of said carriage assembly toward and adjacent said other limiting position, and means operatively connecting said arm with said first actuating lever for pivoting the latter in response to the movement of said arm from said first position to said second position.

11. Apparatus as defined in claim 6 wherein said power operated means comprises a hydraulic motor and said control means comprises a valve mechanism controlling the flow of hydraulic fluid to and from said hydraulic motor.

12. Apparatus as defined in claim 11 wherein said means for moving said control means includes a pivoted actuating lever, means connecting said lever with said valve mechanism so that the latter will be moved into said four positions in response to the pivotal movement of said lever into four corresponding positions.

13. Apparatus as defined in claim 12 wherein said means for moving said control means further includes a latch member mounted for movement between first and second positions, means biasing said latch member into said first positions, means acting between said lever and said latch member for moving the latter from its first position to its second position in response to the movement of said lever from its fourth corresponding position to its third corresponding position and for moving said lever from its third corresponding position to its fourth corresponding position in response to the movement of said latch member from its second position to its first position, locking means biased for movement into a position of engagement with said latch member to prevent movement of the latter from said second position to said first position, and means operable in response to the movement of said carriage assembly toward and adjacent said one limiting position for moving said locking means out of its position of engagement with said latch member.

14. Apparatus as defined in claim 13 wherein said locking means comprises a bell crank lever having a first arm for engaging said latch member, a second arm movable in response to the movement of said carriage assembly toward and adjacent said one limiting position.

15. Apparatus as defined in claim 14 wherein said bell crank lever includes a third arm and spring means connected between said third arm and said latch member.

16. Apparatus as defined in claim 14 including a decelerating unit mounted on said boom adjacent said one limiting position, said decelerating unit including a decelerating member mounted on said boom for movement between first and second positions, spring means biasing said decelerating member into said first position, shock absorber means controlling the movement of said decelerating member against the action of said spring means, said decelerating member including a portion engageable by said carriage assembly in response to the movement of the latter toward and adjacent said one limiting position for effecting movement of said decelerating member therewith from said first position to said second position, said decelerating member including a portion engageable with said second bell crank lever arm to move the latter and hence said first arm out of its position of engagement with said latch member in response to the movement of said decelerating member into its second position.

17. Apparatus of the type described comprising a boom, a carriage assembly mounted on said boom for movement from a pipe pick-up position to a pipe discharge position on said boom while supporting a pipe and from said pipe discharge position back to said pipe pick-up position to pick up another pipe, power operated means for effecting movement of said carriage assembly in either direction between said positions, means for actuating said power operated means to effect movement of said carriage assembly in either direction, means for de-actuating said power-operated means and stopping the movement of said carriage assembly in said pick-up position, carriage assembly engaging means mounted on said boom adjacent said pick-up position for movement in response to the movement of said carriage assembly toward and adjacent said pipe discharge position, means for applying a yielding resistance to the movement of said carriage assembly engaging means to progressively retard the movement of said carriage assembly by said power-operated means toward said discharge position, and means for de-actuating said power-operated means and stopping the movement of said carriage assembly in said discharge position after a predetermined amount of movement of said carriage assembly engaging means.

No references cited.